United States Patent [19]

Riley

[11] Patent Number: 4,479,395
[45] Date of Patent: Oct. 30, 1984

[54] DIFFERENTIAL GEAR HOUSING MOUNTED POWER TAKE-OFF UNIT

[76] Inventor: Dale Riley, P.O. Box 709, Eufala, Okla. 74432

[21] Appl. No.: 304,243

[22] Filed: Sep. 21, 1981

[51] Int. Cl.³ .................. F16H 37/00; F16H 37/16
[52] U.S. Cl. .................. 74/15.84; 74/15.82; 74/405
[58] Field of Search ........... 74/15.69, 15.6, 15.88, 74/15.86, 405, 15.82, 15.84, 15.8

[56] References Cited

U.S. PATENT DOCUMENTS

| B 533,968 | 1/1976 | Cummins et al. | 74/15.69 |
|---|---|---|---|
| 1,786,067 | 12/1930 | Horste . | |
| 1,915,015 | 6/1933 | Dalager . | |
| 2,100,677 | 11/1937 | Wagner | 74/15.86 |
| 2,100,678 | 11/1937 | Wagner . | |
| 2,464,059 | 3/1949 | Roos et al. . | |
| 2,817,408 | 12/1957 | Klemm | 74/15.69 |
| 2,885,907 | 5/1959 | Glamann | 74/15.69 |
| 3,049,929 | 8/1962 | Wagner | 74/15.88 |
| 3,065,643 | 11/1962 | Mark et al. | 74/15.84 |
| 3,296,895 | 1/1967 | Karlsson | 74/15.86 |
| 3,540,297 | 11/1970 | Wagner et al. . | |
| 3,548,667 | 12/1970 | Hoover . | |
| 3,828,878 | 8/1974 | Clapsaddle, Jr. . | |
| 3,982,443 | 9/1976 | Fitch | 74/15.88 |
| 3,986,576 | 10/1976 | Cummins et al. | 74/15.69 |

Primary Examiner—Lawrence J. Staab
Assistant Examiner—Michael D. Bednarek
Attorney, Agent, or Firm—Head, Johnson & Stevenson

[57] ABSTRACT

An economical power take-off unit with a direct mount hydraulic pump that attaches directly and rigidly to the differential housing of an automobile or truck. When installed, the unit shares the differential gear lubricant and is an integral component of the vehicle power train. The unit can be remotely operated from the cab of the vehicle while the vehicle is in motion or stationary. A one way roller clutch is used to protect the hydraulic pump and equipment when the vehicle is operated in reverse gear.

3 Claims, 6 Drawing Figures

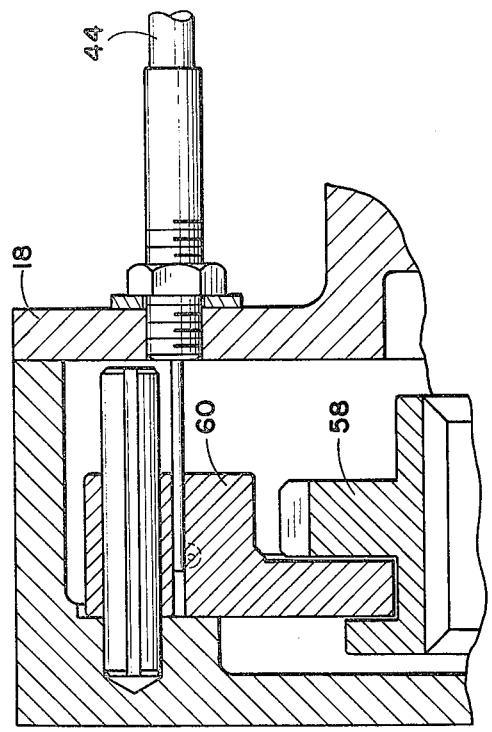
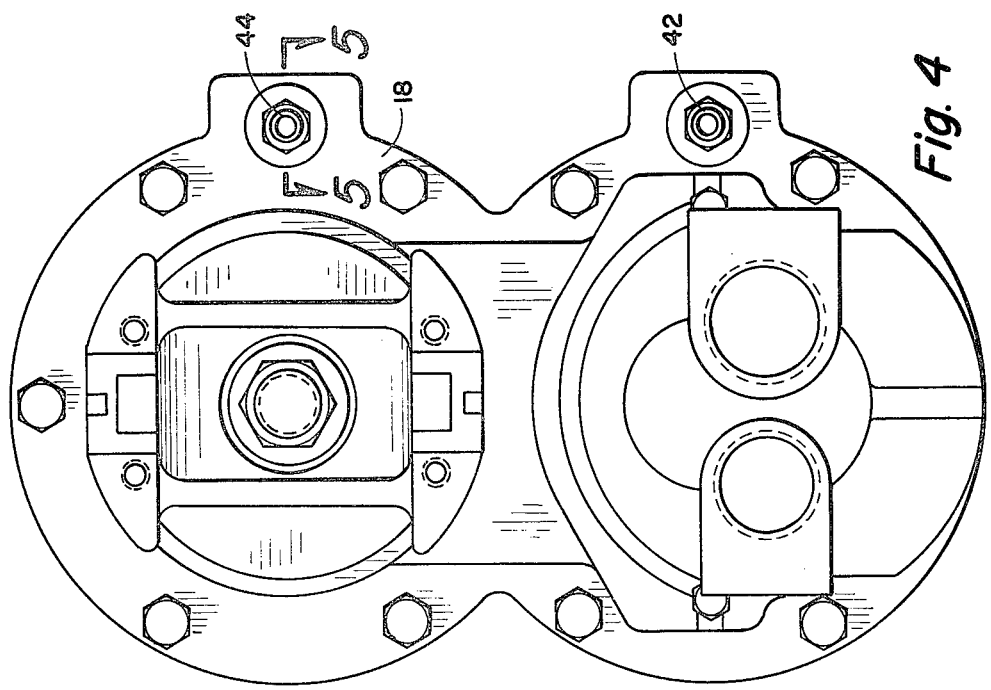

DIFFERENTIAL GEAR HOUSING MOUNTED POWER TAKE-OFF UNIT

BACKGROUND OF THE INVENTION

1. Field of the Invention

This invention relates to a power take-off unit utilizing the propeller shaft of an automobile or truck as its power source. More specifically, the invention relates to a power take-off unit for driving a hydraulic pump that attaches directly and rigidly to the differential gear housing of the rear axle.

2. Description of the Prior Art

Many trucks and other vehicles now in use for highway or road work are adapted to carry hydraulically operated equipment of various types for numerous purposes. The pump for operating this type of equipment is usually driven from the front end of the engine compartment as exemplified in U.S. Pat. No. 3,828,878 wherein a front mounted power take-off unit is required.

Vehicle power take-off units from locations other than the front engine compartment have been suggested and used in the past in a variety of applications. Thus it is generally known to provide for power take-off from various locations in the vehicle including: from openings in the transmission or gear, case, e.g. U.S. Pat. Nos. 3,540,297, 3,548,667, 2,100,677 and 2,100,678; from the rear of the transmission before the drive train, e.g. U.S. Pat. No. 3,296,895; in the drive train between the transmission and differential, e.g. U.S. Pat. Nos. 3,049,929 and 3,982,443; from the rear of the differential, e.g. U.S. Pat. No. 3,986,576; from the transmission via a separate drive train, e.g. U.S. Pat. Nos. 2,817,408 and 2,464,059; and from worm or bevel gears attached to the drive train, e.g. U.S. Pat. Nos. 1,915,015 and 1,786,067. However, these power take-off units are directed to supplying mechanical motion without a hydraulic pump and none represents a unit that can be readily and economically attached to a conventional truck or automobile in order to operate hydraulic equipment and the like.

SUMMARY OF THE INVENTION

In view of the shortcomings of the prior art, I have invented a simple and economical power take-off unit that utilizes the drive shaft of a conventional automobile or truck as the power source to drive a hydraulic pump. The unit attaches directly and rigidly to the differential gear housing of the rear axle. When installed, the unit becomes an integral sealed component in the power train of the vehicle. And lubrication is common with the differential gear lubricant of the rear axle assembly. Thus the present invention provides a power take-off unit adapted for mounting to the differential gear housing of a vehicle comprising:

(a) a torque transmitting means adapted to mount directly to the front of the differential gear housing of the rear axle of the vehicle and adapted to be driven by the drive shaft of the vehicle;

(b) a hydraulic pump mounted directly to the torque transmitting means; and (c) a gear means within the torque transmitting means adapted to selectively drive or not drive the hydraulic pump when the vehicle is either in motion or at rest.

In a preferred embodiment of the presesnt invention the torque transmitting means comprises:

(a) a gear housing adapted to mount to the differential gear housing and adapted to have the hydraulic pump mounted thereto;

(b) a pair of equal diameter, coaxial, splined shafts, one being driven by the drive shaft and the other driving the third member within the differential gear housing; and (c) a driver gear concentrically displaced about and internally meshed with the splined shafts and adapted to be selectively moved axially with respect to the splined shaft thus transmitting or discontinuing the transmission of torque to the rear drive wheels of the vehicle, and wherein the gear means within the torque transmitting means to selectively drive or not drive the hydraulic pump comprises:

(d) the driver gear internally meshed with the splined shafts, being selectively externally engaged and meshed with a driven gear rotatably coupled and selectively positioned along the shaft of the hydraulic pump. The present invention further provides that the driven gear is rotatably coupled to and selectively positioned along the shaft of the hydraulic pump by means of a one way roller clutch. Shift means in communication with the power take-off unit are also provided to operate the unit remotely.

It is a primary object of the present invention to provide an economical power take-off unit and hydraulic pump that readily and easily mounts to a conventional pickup truck or the like. It is a further object that this unit be capable of operation while the vehicle is moving or stationary. It is an additional object that the unit be remotely operated from the cab of the vehicle. Fulfillment of these objects and the presence and fulfillment of other objects will be apparent upon reading of the specification and claims taken in conjunction with the attached drawings.

BRIEF DESCRIPTION OF THE DRAWINGS

FIG. 4 is a front view of the power take-off unit of FIG. 2.

FIG. 5 is a partial cut-away view of a shift means of the power take-off unit of FIG. 2.

DESCRIPTION OF THE PREFERRED EMBODIMENT

Figure 1:
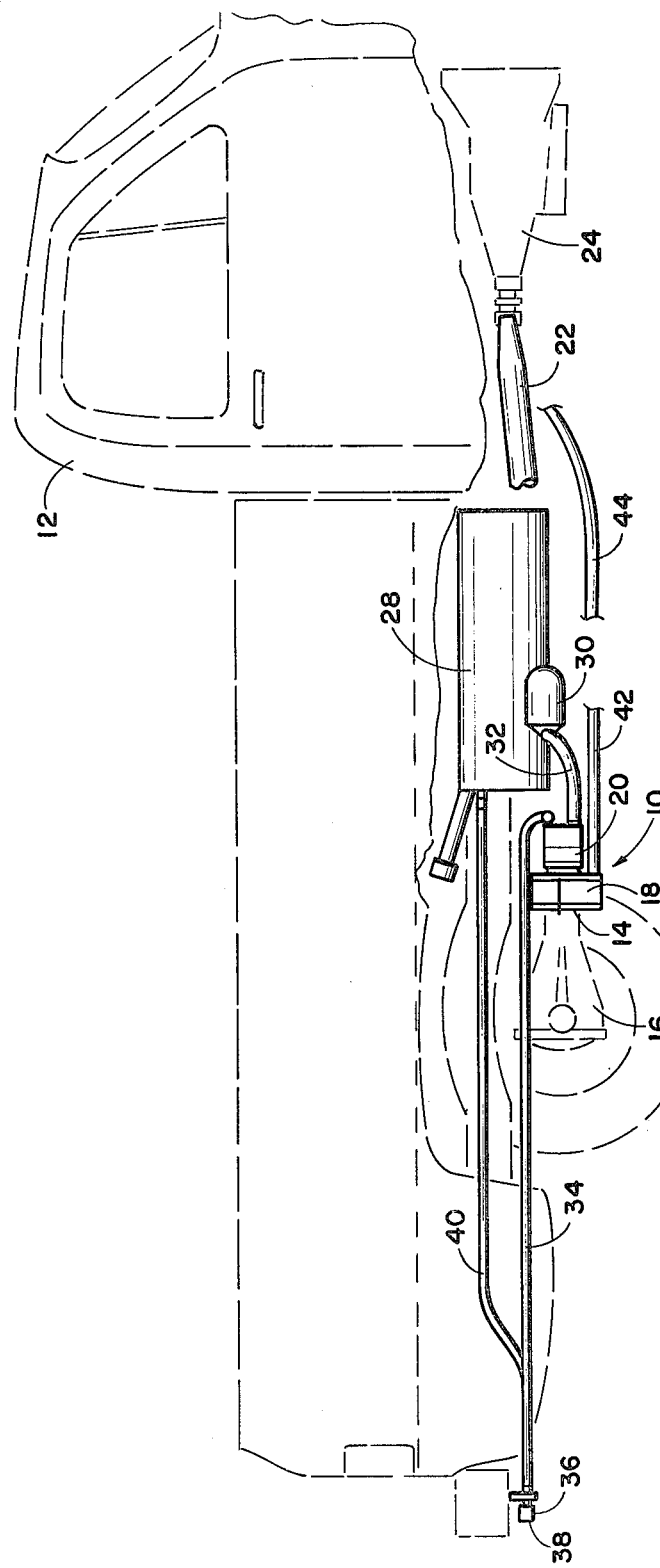
FIG. 1 is a partial cut-away view of a pickup truck containing the power take-off unit according to the present invention.

The power take-off unit of the present invention, how it functions, how it is incorporated into an automobile or truck and the advantages associated with its use can perhaps be best explained and understood by reference to the drawings. FIG. 1 shows a preferred embodiment of the power take-off unit, generally designated by the numeral 10, installed in a pickup truck 12. As illustrated, adapter plate 14 of the power take-off unit 10 is attached directly to the rear end differential housing 16 of the pickup truck 12. A gear box housing 18 is attached to the adapter plate 14 with hydraulic pump 20 mounted to the housing 18. Drive shaft 22 is attached to the transmission 24 at one end and to a universal joint yoke 62 (obscured by the hydraulic pump 20, see FIG. 2) of the power take-off unit 10 at the other end, thus making the unit an integral part of the power train of the truck.

A hydraulic fluid storage tank 28 is mounted under the fenderwall of the pickup truck 12 with a suction filter 30 and inlet hose 32 delivering hydraulic fluid to the inlet side of pump 20. The high pressure hose 34 on the outlet side of pump 20 delivers hydraulic fluid to the rear of the truck terminating in a conventional male quick-release coupling 36. A female quick-release coupling 38 is located next to the male coupling 36 to receive hydraulic fluid and return it to the storage tank 28 via return hose 40. In operation, the auxiliary hydraulic equipment to be used is attached, at couplings 36 and 38, and remote shifter cables 42 and 44 are used by the operator in the cab of the truck according to whether the truck is in motion or stationary.

Figure 2:
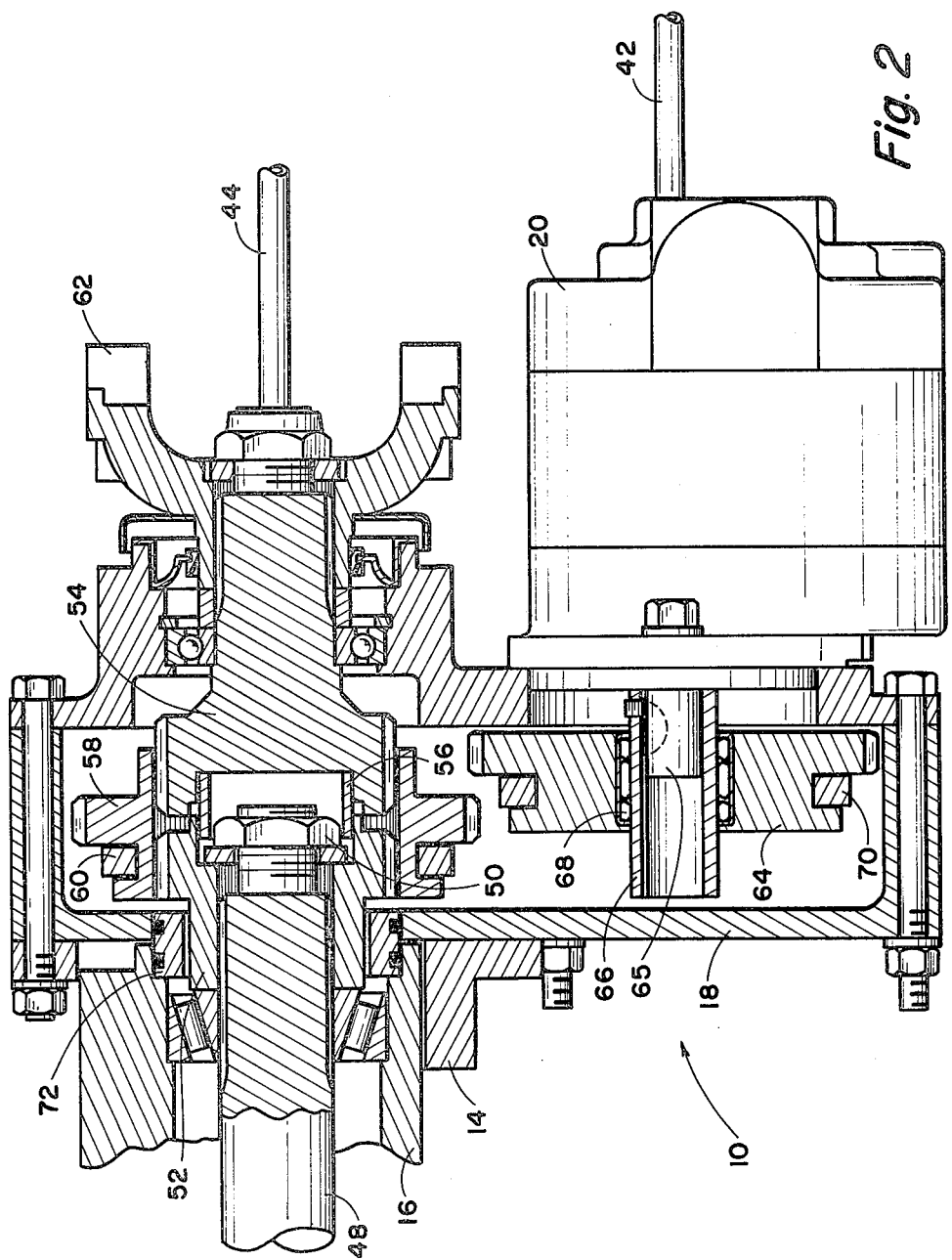
FIG. 2 is a top cut-away view of a preferred embodiment of the power take-off unit according to the present invention.

FIG. 2 shows a cut-away top view of the power takeoff unit 10 of FIG. 1 with adapter plate 14 mounted to the differential housing 16. The original driven third member shaft 48 and locking nut with washer 50 are used to secure a splined adapter shaft 52. The gear box housing 18, holding a second splined shaft 54, is bolted to the adapter plate 14. An internal bearing surface 56 maintains axial alignment of shaft 54 with shaft 52. A concentric shaft driver gear 58 is internally meshed with the splined shafts 52 and 54. Shifter cable 44 is attached to shifter yoke 60 which moves the driver gear 58 longitudinally along the axis of the shafts 52 and 54. Attached to the front of the splined shaft 54 external to the gear box housing 18 is a universal joint yoke 62 which attaches to the drive shaft of the vehicle (not shown). In normal vehicle operation, torque from the drive train is transmitted to the third member through universal joint yoke 62, splined shaft 54, driver gear 58 and splined shaft 52. When driver gear 58 is moved forward by shifter yoke 60 and shifter cable 44, the splined shaft 52 is disengaged thus disconnecting the power source from the rear driving wheels of the vehicle. In this stationary mode of operation, the forward movement of the driver gear 58 will result in driver gear 58 engaging to and meshing with driven gear 64. Driven gear 64 is rotatably coupled to shaft 65 of hydraulic pump 20 through a one way roller clutch 68 and pump shaft adapter 66. Shifter cable 42 is attached to shifter yoke 70 which moves the driven gear 64 longitudinally along the pump shaft adapter 66, thus engaging or disengaging the driver gear 58. In this manner, the hydraulic pump can be selectively powered at the discretion of the operator either when the vehicle is in motion or is stationary.

Figure 3A:
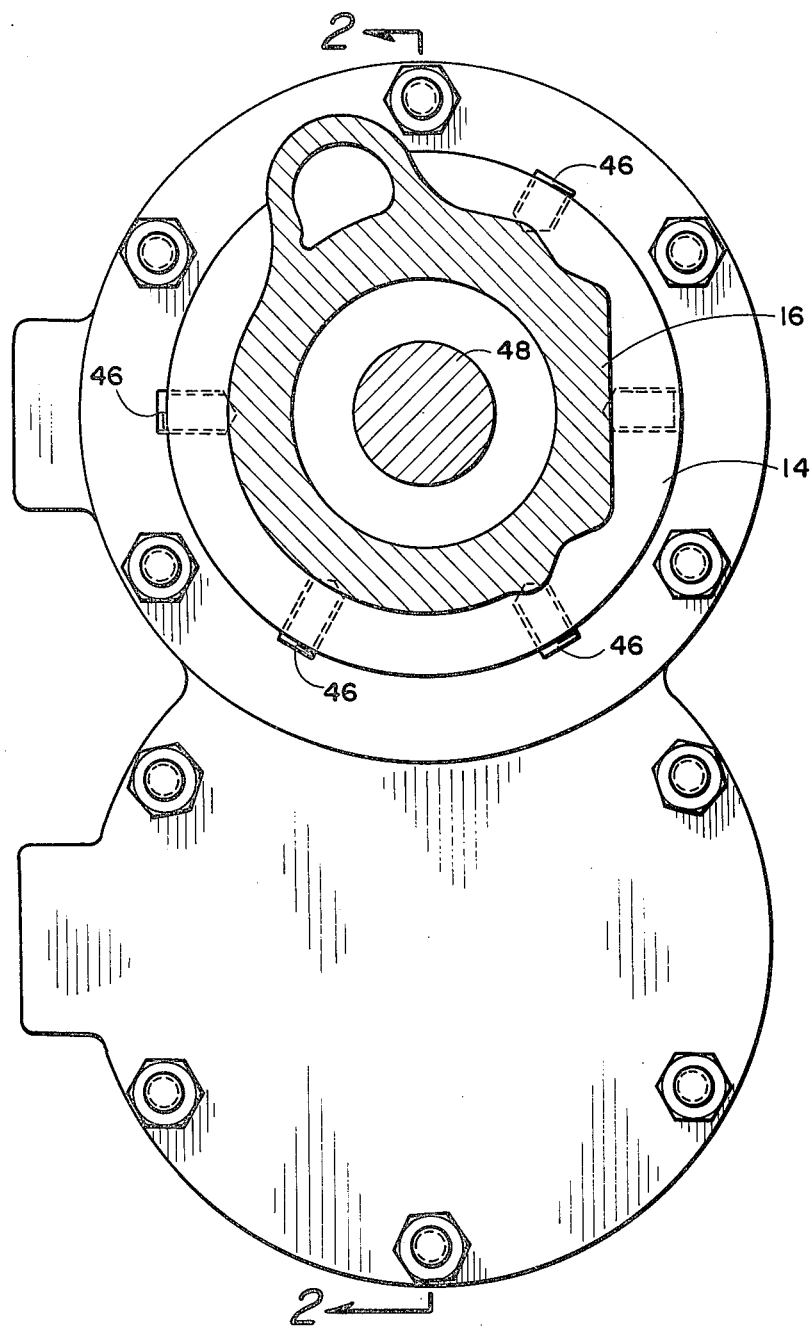
FIGS. 3A and 3B are rear views of the power take-off unit of FIG. 2 illustrating alternate methods of attachment to the differential gear housing.
Figure 3B:
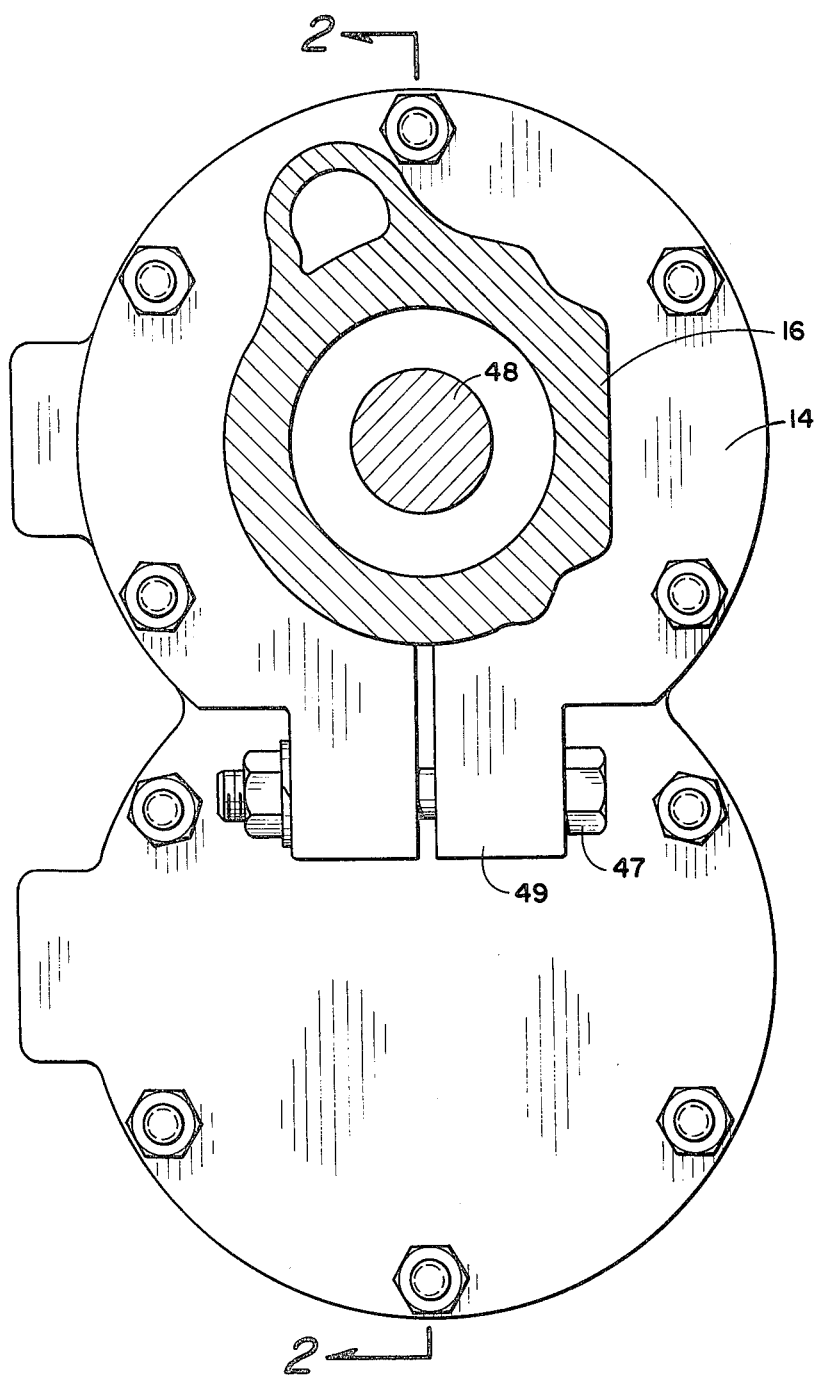

As illustrated in the rear end view of FIG. 3A, a series of cone-pointed set screws 46 are used to fasten the adapter plate 14 to the differential housing 16; FIG. 3B illustrates an alternate embodiment in which bolt 47 and compression clamp 49 are used to fasten the adapter plate 14 to the differential housing 16.

FIG. 4 illustrates how the shifter cables 42 and 44 enter the front of the gear box 18. FIG. 5 illustrates how shifter cable 44 engages with shifter yoke 60 and is also descriptive of how shifter cable 42 engages with shifter yoke 70.

In order to install the power take-off unit of the present invention, the drive shaft and the universal joint yoke attached to the differential are removed from the vehicle. An adapter plate is then rigidly attached to the differential housing by bolt and compression clamp, cone-pointed set screws, skip welding or other appropriate technique. After installing seal ring 72, a splined adapter shaft is then secured to the third member shaft and the main gear box and hydraulic pump assembly bolted to the adapter plate. A shortened and balanced drive shaft is then installed to complete the mechanical installation. The hydraulic fluid storage tank, hoses, connectors and shift controls are then installed in the vehicle. Thus it should be apparent that mounting the hydraulic pump to the power take-off unit, which in turn mounts directly to the differential, simplifies the connection between source and load as well as simplifying the overall installation of the unit to the vehicle.

The power take-off unit can be manufactured from any of the well known materials; preferably, the gear box housing is of aluminum to reduce weight. The hydraulic pump, tank, hoses, shift means, and the like can be selected from any of the well known commercially available products. Hydraulic relief valves and recycle lines can be installed as needed.

Other advantages of the present invention include the fact that using a hydraulic pump to convert shaft power to fluid power provides tremendous flexibility in the types of accessories that can be powered. Also, direct rigid mounting to the differential housing produces an integral, sealed unit with continuous lubrication for all components using the differential gear lubricant. Therefore, the unit can be used with either a conventional stick or an automatic transmission. And, the one way roller clutch feature prevents damage to the hydraulic pump due to reverse rotation and provides protection against damage to any unidirectional component that is to be powered.

Having thus described the invention with a certain degree of particularity, it is manifest that many changes can be made in the details of construction and arrangement of the components without departing from the spirit and scope of the disclosure. Therefore, it is to be understood that the invention is not limited to the embodiments set forth herein for purposes of exemplification, but is to be limited only by the scope of the attached claims, including a full range of equivalents to which each element thereof is entitled.

I claim:

1. A power take-off unit adapted for mounting to a differential gear housing, drive shaft and third member of a rear axle of a rear wheel drive vehicle comprising:
   (i) a torque transmitting means adapted to mount directly to said differential gear housing of said rear axle of said rear wheel drive vehicle and adapted to be driven by said drive shaft of said vehicle, wherein said torque transmitting means comprises:
      (a) a gear housing adapted to mount to said differential gear housing and adapted to have said hydraulic pump mounted thereto;
      (b) a pair of equal diameter, coaxial, splined shafts, one being driven by said drive shaft and the other driving the third member within said differential gear housing; and
      (c) a driver gear concentrically displaced about and internally meshed with said splined shafts and adapted to be selectively moved axially with respect to said splined shaft thus transmitting or discontinuing the transmission of torque to the rear drive wheels of said vehicle;
   (ii) a hydraulic pump mounted directly to said torque transmitting means; and
   (iii) a gear means within said torque transmitting means adapted to selectively drive or not drive said hydraulic pump when said vehicle is either in motion or at rest and wherein said gear means comprises said driver gear internally meshed with said splined shafts, being selectively externally engaged and meshed with a driven gear rotatably coupled to and selectively positioned along the shaft of said hydraulic pump.

2. A power take-off unit of claim 1 wherein said driven gear is rotatably coupled to and selectively positioned along the shaft of said hydraulic pump by means of a one way roller clutch.

3. A power take-off unit of claim 1, or 2 further comprising shift means in communication with said power take-off unit to operate the said unit remotely.

* * * * *